United States Patent Office 3,140,047
Patented July 7, 1964

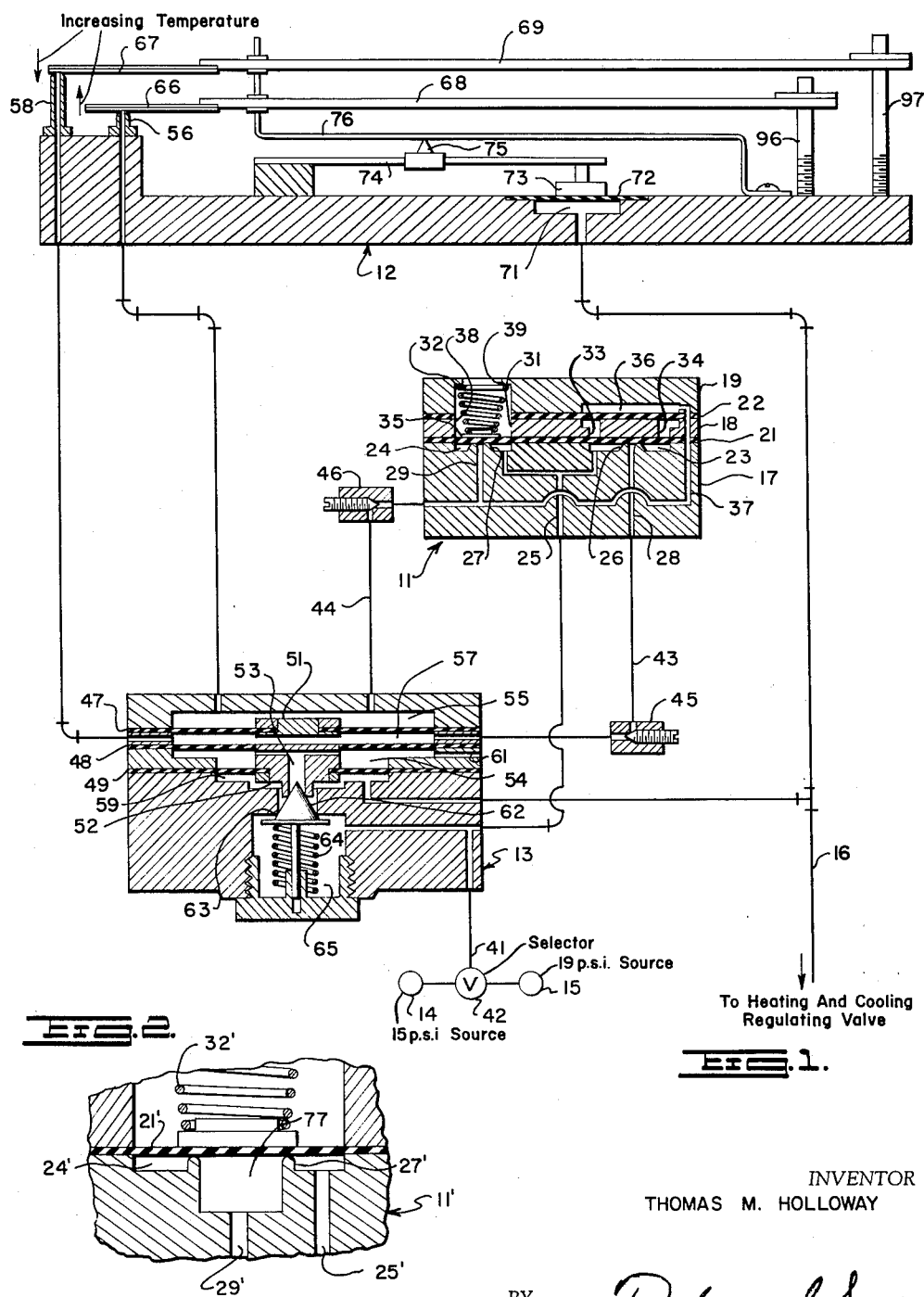

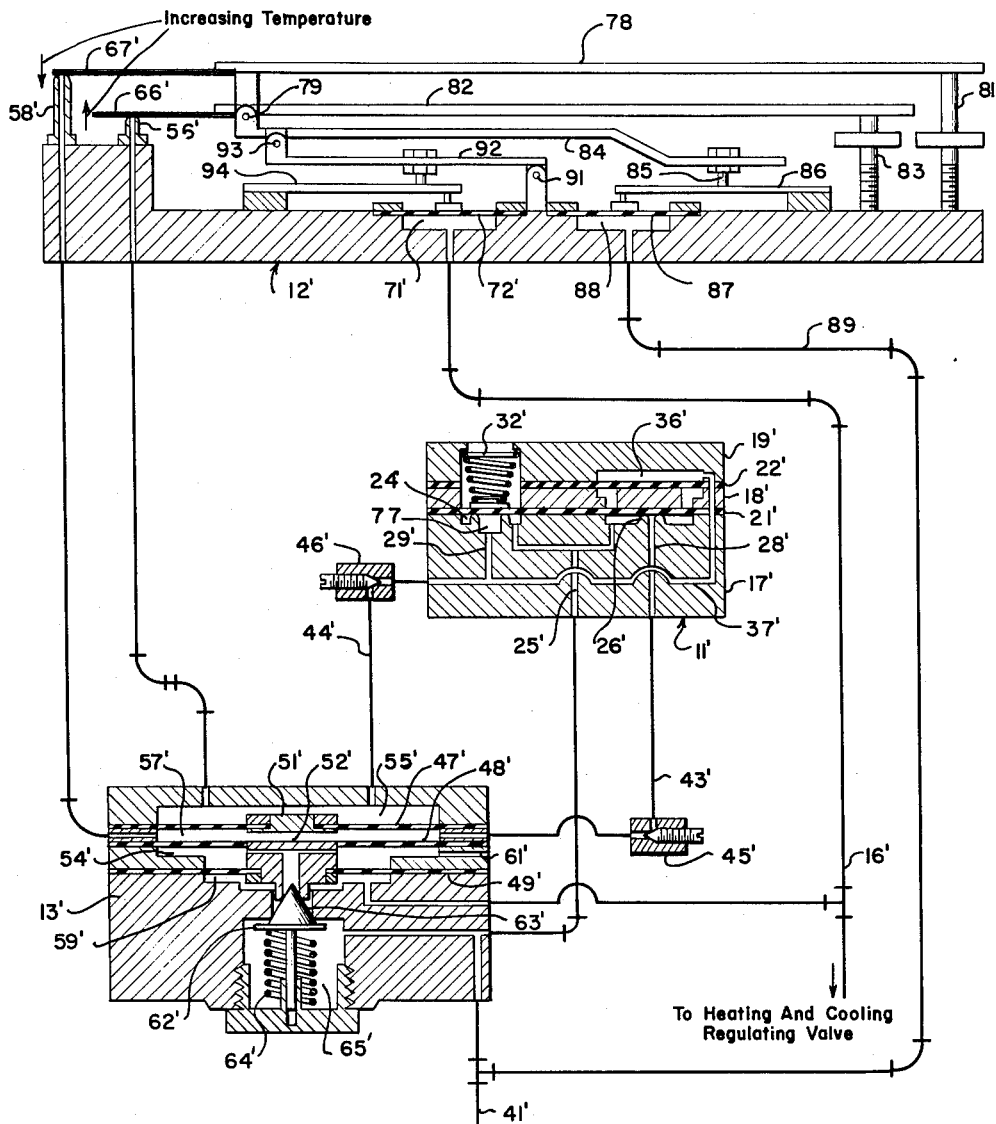
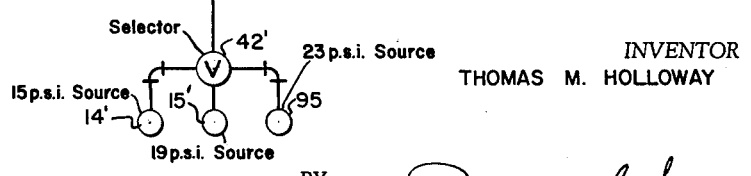

3,140,047
FLUID DISTRIBUTION DEVICE AND
SYSTEM THEREFOR
Thomas M. Holloway, Waukesha, Wis., assignor to Johnson Service Company, Milwaukee, Wis., a corporation of Wisconsin
Filed June 5, 1962, Ser. No. 200,614
13 Claims. (Cl. 236—1)

This invention relates to fluid distribution devices and to systems employing same.

This application is a continuation-in-part of my copending application, Serial No. 55,062, filed September 9, 1960, now abandoned.

The object of the invention is to provide a fluid switch which selectively transmits fluid from a common supply passage to either of two outlet passages, depending upon the pressure of the supply fluid. This device is useful in various types of systems but is particularly useful in pneumatic thermostats for air conditioning systems wherein switching between day and night heating or between heating and cooling operation is accomplished by changing the supply pressure. The basic form of the switch is described herein in connection with a heating and cooling thermostat.

In the basic embodiment of the invention, supply fluid at certain pressures is always transmitted only to one outlet passage and supply fluid at certain different pressures is always transmitted only to the other outlet passage. A modified switch functions in generally the same manner but in addition it affords a particular pressure range in which supply fluid is transmitted to either outlet passage depending upon the direction in which supply pressure is changing when that range is entered. The device is so arranged that when supply pressure is within that particular range, the outlet passage to which it is transmitted is the same passage to which fluid had been transmitted just prior to the time the particular pressure range was entered.

While various other uses of the modified switch will be apparent to those skilled in the art, the invention provides an environment which is especially suited to utilize its unique characteristic. In this environment, the switch is combined with a pneumatic thermostat for air conditioning systems in such manner that selection between day and night heating and day and night cooling may be had simply by using only three different supply pressures. The only prior solution to this four-temperature response-reversing problem known to applicant requires the use of four different supply pressures, and this obviously entails greater cost of manufacture and installation and greater probability of leakage.

Preferred forms of the invention will now be described in detail with reference to the accompanying drawings in which:

FIG. 1 is a schematic diagram showing the basic switch in combination with a heating-cooling pneumatic thermostat.

FIG. 2 is an enlarged view of a portion of the switch showing the modification employed in the second form of the invention.

FIG. 3 is a schematic diagram showing the novel four-temperature pneumatic thermostat employing the modified fluid switch.

Figure 4:
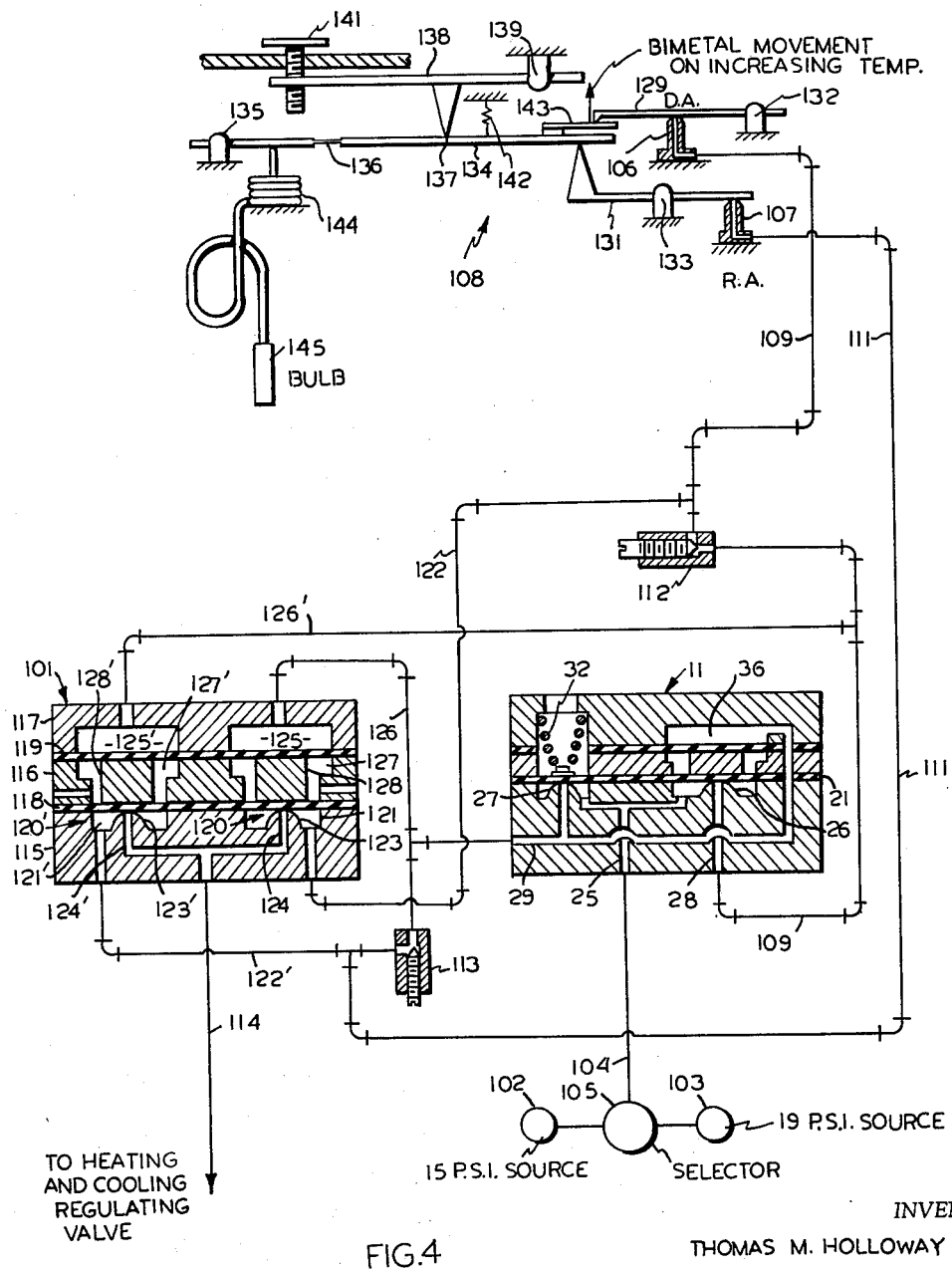
FIG. 4 is a schematic diagram showing the basic switch in a heating-cooling pneumatic thermostat of a modified type.

As shown in FIG. 1, the fluid switch 11 is employed in a pneumatic thermostat including a dual bimetal-leak port assembly 12, a relay 13, a pair of compressed air sources 14 and 15, and a branch line 16 which leads to the conventional heating and cooling media regulating valve (not shown). This regulating valve is one which reduces the flow of heat exchange medium upon a rise in branch line pressure. The switch 11 comprises three rigid body parts 17-19 which are separated by two rubber-like diaphragms 21 and 22 that perform valving as well as sealing functions. These parts are held together by screws (not illustrated).

The bottom body part 17 has a plane upper face containing two annular grooves 23 and 24 which serve as inlet ports for the two valve units, to be described, and which are connected with a common inlet passage 25. The grooves 23 and 24 define and are coaxial with annular valve seats 26 and 27, respectively, whose upper edges are rounded to provide for line contact with the diaphragm 21 that serves as the movable element of both valve units. In the center of the seats 26 and 27 are outlet ports which communicate with the separate outlet passages 28 and 29.

The middle body part 18 has plane parallel upper and lower faces and contains a through circular opening 31 which matches a similar opening in diaphragm 22 and which houses the tapered coil spring 32. In a typical switch, this spring 32 is designed to hold diaphragm 21 on seat 27 until the pressure in annular groove 24 reaches 17 p.s.i. The lower outer margin of opening 31 overlies the outer margin of annular groove 24. This body part 18 also contains a stepped circular opening 33 whose lower outer margin overlies the outer margin of annular groove 23. Centered within opening 33 is a circular disc 34 which is attached to both of the diaphragms 21 and 22 and which serves as a thrust transmitter. A spring seat 35 is centered within opening 31 and is attached to diaphragm 21.

The top body part 19 has, on its lower face, a circular cavity 36 whose diameter equals the larger diameter of stepped opening 33 and which is connected with the outlet passage 29 by a passage 37 that passes through both diaphragms and all three body parts. Body part 19 also contains a through opening 38 which is aligned with and forms an extension of opening 31 and is provided with a shoulder 39 against which the upper end of spring 32 seats.

The common inlet passage 25 of the fluid switch 11 is connected with the pair of compressed air sources 14 and 15 through supply line 41 and a selector valve 42 which selectively connects one or the other of the sources with the supply line. The outlet passages 28 and 29 are connected with the relay 13 through lines 43 and 44 and needle valves 45 and 46, respectively. Relay 13 is of the construction shown in FIG. 1 of Otto Patent 2,193,295, granted March 12, 1940, and responds to the pressures developed by the bimetal-leak port assembly 12 which controls both heating and cooling. The relay 13 includes the diaphragms 47, 48 and 49; 47 and 48 being comparable in size and 47 having a thrust button 51 at its center through which it may react in one direction on diaphragm 48. Diaphragm 49 is smaller in area and together with the diaphragm 48 carries the hub 52 which is formed with an exhaust passage 53 that communicates with the space 54 between the diaphragms. The chamber 55 above diaphragm 47 is connected with the leak port 56 and with the line 44, and the chamber 57 between diaphragms 47 and 48 is connected with leak port 58 and with the line 43. The motor chamber 59 beneath diaphragm 49 communicates with branch line 16 and the space 54 between diaphragms 48 and 49 is vented to atmosphere at 61. A conical valve 62, which is guided for vertical movement in the housing of the relay, functions as an exhaust valve in combination with hub 52 and as a supply valve in combination with the edge 63 of the relay housing.

Valve 62 is biased upward by a coil spring 64. The space 65 surrounding the valve stem and spring 64 communicates with the supply line 41.

The dual bimetal-leak port assembly 12 includes the two leak ports 56 and 58 already mentioned and two bimetallic bars 66 and 67 which are attached to the ends of spring levers 68 and 69, respectively supported in cantilever fashion by the adjusting posts 96 and 97. The bimetallic bars 66 and 67 control cooling and heating, respectively, and are reversely set so that a temperature increase causes element 66 to move away from its leak port 56 and causes element 67 to move toward its leak port 58. A feedback motor, having a working chamber 71 which is connected with the branch line 16 and a diaphragm 72 which carries the thrust button 73, reacts on both of the spring levers 68 and 69 through cantilever spring 74, knife edge 75 and lever 76. Needle valves 45 and 46 are so adjusted that their flow capacities are less than the wide open flow capacities of leak ports 56 and 58, resepctively.

In a typical installation, the compressed air sources 14 and 15 are at 15 p.s.i.g. and 19 p.s.i.g., respectively. During the heating season, the selector valve 42 is shifted to a position in which it connects source 14 with the supply line 41 so that air at 15 p.s.i. passes to the inlet passage 25 of switch 11 and to the space 65 in relay 13. This pressure, acting on that portion of diaphragm 21 overlying annular groove 24, is not able to move the diaphragm away from the seat 26. Consequently, no air is transmitted through this valve unit of the switch, and cavity 36 and chamber 55 vent to atmosphere through leak port 56. Since, at this time, diaphragm 21 is held on seat 26 only by weight of circular disc 34, the diaphragm is forced away from this seat with the result that passages 25 and 28 are interconnected. Therefore, supply fluid is delivered to chamber 57 of relay 13 through line 43 and needle valve 45 and from there, through leak port 58, to atmosphere.

Movement of the bimetallic bar 67 relatively to leak port 58 in response to changes in temperature serves to vary the pressure in chamber 57 and, since this bar is arranged to move toward the leak port when temperature rises, the pressure varies directly with the temperature. As is known in the art, variations in this pressure cause valve 62 to admit fluid to and exhaust fluid from space 59 and the connected branch line 16 and thus ultimately serve to vary the flow of heating medium to the space whose temperature is being controlled. The bimetallic bar 67 also is moved relatively to leak port 58 by the feedback motor 71, 72 in response to changes in branch line pressure but, since this pressure varies directly with temperature, these movements of bar 67 are in directions opposite to those produced by the temperature. Motor 71, 72 also moves bimetallic bar 66 but this action produces no effect because chamber 55 is isolated from the supply. With the use of feedback, the movement of the bimetallic bar per degree change in temperature can be increased thus decreasing hysteresis and dead spot in the controller. When the branch line pressure reaches that value dictated by the prevailing temperature, the valve 62 will take up its lap position in which fluid is neither withdrawn from nor transmitted to space 59 and the branch line 16.

In the cooling season, selector valve 42 is shifted to a position in which source 15 is connected with the supply line 41. This raises the pressure in common inlet passage 25 and groove 24 to 19 p.s.i. and produces a force on that portion of diaphragm 21 overlying the groove sufficient to overcome the bias of spring 32 and lift the diaphragm away from the seat 27. This allows fluid to flow into outlet passage 29 and from there via passage 37 into cavity 36. Inasmuch as the diameter of this cavity is greater than the outside diameter of the annular groove 23, the diaphragm 21 will be forced downward into sealing engagement with the seat 26 even though the pressure acting beneath diaphragm 21 is the same as the pressure in the cavity 36 acting above diaphragm 22. Closure of this valve unit interrupts flow to chamber 57 in relay 13 and the pressure in this space bleeds off to atmosphere through leak port 58.

Fluid at 19 p.s.i. entering outlet passage 29 also flows through line 44 and needle valve 46 to chamber 55 and from there to atmosphere through leak port 56. The pressure which builds up in this chamber forces thrust button 51 into contact with hub 52 and, since chamber 57 is now vented, variations in this pressure control the operation of valve 62. The bimetallic bar 66 is set reversely to the bar 67 so now relay 13 becomes reverse acting, i.e., branch line pressure is varied in a sense opposite to variations in temperature. This is the desired mode of operation inasmuch as the heat exchange medium whose flow is being controlled by the thermostat is a cold fluid. As in the operation of the heating system, the feedback motor 71, 72 modifies the positions of the bimetallic bars 66 and 67 in accordance with branch line pressure. However, in this case the modifying movement of bar 67 produces no control action.

If the selector valve 42 is again shifted to the position in which source 14 is connected with the supply line 41, diaphragm 21 of switch 11 will be moved into sealing engagement with seat 27 thus permitting cavity 36 and chamber 55 to vent. Simultaneously that portion of diaphragm 21 overlying annular grooves 23 will move away from seat 26 and supply fluid will again be supplied to space 57 in the relay 13. The thermostat now is again ready to control the flow of a hot heat exchange medium.

From the preceding description it is seen that at certain pressures (those below 17 p.s.i. in the device described) the switch 11 always transmits fluid from common inlet passage 25 to outlet passage 28, and that at certain other pressures (those above 17 p.s.i.) the device always transmits supply fluid to outlet passage 29. The reason for this is that the circular area inside of the line of contact between seat 27 and diaphragm 21 is so small relative to the annular area of groove 24 that the additional area of diaphragm 21 which is subject to inlet pressure when the valve unit is open has no appreciable effect on the operation of the valve. In other words, the valve opens and closes at approximately the same pressure. In the modified switch shown in FIGS. 2 and 3, the valve unit analogous to the diaphragm 21 and seat 27 of FIG. 1 has been designed so that there is an appreciable differential between the opening and closing pressures. With this arrangement, there is a pressure range in which supply fluid may be transmitted to either of the two outlet passages depending upon the direction in which supply pressure was changing when that range was entered.

Except for the valve unit just mentioned, the modified switch 11′ is constructed in the same manner and employs the same parts as the basic switch 11. Therefore, corresponding parts are identified by the same numbers with primes added for clarification. Referring to FIG. 2, the outlet passage 29′ terminates in an enlarged outlet port 77 which is centered on the seat 27′. The outside diameter of annular groove 24′ is the same as the outside diameter of groove 24 and therefore the enlargement of the outlet port changes greatly the areas of diaphragm 21′ within and without the circular line of contact between the seat and the diaphragm. In a typical switch 11′ of this type, these areas are so selected and correlated with the force exerted by spring 32′ that the valve unit does not open until the supply pressure reaches 21 p.s.i. and does not close again until that pressure drops below 17 p.s.i. Thus as supply pressure is increased, fluid is transmitted exclusively to outlet passage 28′ until a value of 21 p.s.i. is reached, at which time passage 28′ is closed and the switch commences to transmit fluid to outlet passage 29′. When supply pressure is now lowered, outlet passage 29′ continues to receive supply fluid until a value of 17 p.s.i. is reached. Thus it can be seen that the switch 11' affords a pressure range (between 17 p.s.i. and 21 p.s.i. in one example) within which fluid is transmitted selectively to either outlet passage depending upon the direction in which that pressure was changing when the range was entered.

This unitque characteristic of switch 11' is utilized to great advantage in the novel four-temperature reversing thermostat of FIG. 3. Many of the parts, including the relay, used in this thermostat are counterparts of those employed in the FIG. 1 thermostat and, therefore, these parts are designated by the same numerals with primes added for clarity. As shown in FIG. 3, the thermostat includes a dual bimetal-leak port assembly 12' provided with a pair of leak ports 56' and 58' that are controlled by the bimetallic bars 66' and 67', respectively. As in assembly 12, the bars 66' and 67' are reversely set and the bar 66' and leak port 56' are in control during the cooling season and bar 67' and leak port 58' are in control during the heating season. The bimetallic bar 67' is mounted as an extension of an L-shaped lever 78 pivoted at 79 and adjustable by turning screw post 81 which is threaded into the base. Bimetallic bar 66' is mounted as an extension of lever 82 which also is pivoted at 79 and is adjustable by turning a second screw post 83 that is threaded into the base.

The common pivot 79, for levers 78 and 82, is carried by one end of a floating lever 84 whose other end is in adjustable thrust relation through the strut 85 with a cantilever spring 86. The nuts shown on strut 85 afford the desired adjustment. The movable end of spring 86 is supported by a diaphragm 87 which forms part of a fluid pressure readjustment motor whose working chamber 88 is connected by line 89 with the supply line 41'. This motor automatically changes the set points of the thermostat for day and night operation during both the heating and cooling season.

A pivot 91, fixed on the base of assembly 12', carries one end of a lever 92, whose other end is pivoted at 93 to the floating lever 84. A fluid pressure feedback motor, having a working chamber 71' connected with branch line 16' and a diaphragm 72', reacts on both of the levers 78 and 82 through a cantilever spring 94 and lever 92. This motor 71', 72' performs the same function as the feedback motor 71, 72 in assembly 12.

The supply line 41' of FIG. 3 is selectively connected with any of three pressure sources 14', 15' and 95 by a selector valve 42'. In a typical installation, these sources 14', 15' and 95 supply air at 15, 19 and 23 p.s.i., respectively. During the daytime in the heating season, selector valve 42' is shifted to a position in which source 14' is connected with supply line 41' and, therefore, air at 15 p.s.i. is delivered to relay 13', switch 11' and readjustment motor 87, 88. This pressure acting on the annular area of diaphragm 21' overlying annular groove 24' is ineffective to overcome the closing bias of spring 32'. Consequently, this valve unit of switch 11' remains closed. However, supply fluid does open the other valve unit of switch 11' and flows through outlet passage 28' and line 43' to the chamber 57' of relay 13'. As explained previously, bimetallic bar 67' and leak port 58' control the pressure in chamber 57' and this pressure in turn, governs the operation of valve 62' which varies the pressure in branch line 16'. With bimetallic bar 67' in control, the thermostat is direct acting and therefore, the flow of the hot exchange medium is increased and decreased as temperature falls and rises, respectively.

At night, the selector valve 42' is shifted to connect source 15' with the supply line 41', thereby supplying air at 19 p.s.i. to the various components of the thermostat. This supply pressure also is ineffective to move diaphragm 21' away from the seat 27' against the bias of spring 32' so this valve unit remains closed and supply air leaves the switch through outlet passage 28'. The increase in supply pressure delivered to working chamber 88 of the readjustment motor causes that motor, acting through the linkages of assembly 12', to move bimetallic bar 67' toward the leak port 58'. The effect of this is to increase the pressure in chamber 57' of relay 13' and in branch line 16' and thus ultimately reduce the flow of heating medium to the space whose temperature is being controlled. As a result, the thermostat automatically maintains a lower temperature (i.e., lower set point) at night during the heating season.

During the cooling season, nighttime operation is had by shifting selector valve 42' to the position in which source 95 is connected with the supply line. The 23 p.s.i. air supplied by this source is effective, acting on the annular area of groove 24' to move diaphragm 21' away from seat 27' and thus permit air to flow to outlet passage 29'. Because of the presence of passage 37', the pressure in cavity 36' immediately rises to 23 p.s.i. and forces diaphragm 21' against the seat 26'. Chamber 57' of relay 13' now vents through leak port 58' and supply fluid is transmitted to chamber 55'. Under these conditions, leak port 56' and bimetallic bar 66' are effective to control the operation of valve 62', and consequently, to vary the pressure in the branch line 16'. Since bimetallic bar 66' moves away from leak port 56' when temperature rises, the thermostat is now reverse acting. The rise in pressure in chamber 88 of the readjustment motor moves the bimetallic bars 66' and 67' toward their leak ports but since bar 66' and leak port 56' are in control, the movement of bar 67' has no effect. However, the movement of bar 66' has the effect of establishing the relatively high set point which is required at night during the cooling season.

In order to convert the thermostat to daytime operation in the cooling season, valve 42' is shifted back to the position in which source 15' is connected with the supply line 41' thereby reducing the pressure in annular groove 24' of switch 11' to 19 p.s.i. Since, at this time, diaphragm 21' is away from seat 27', supply pressure is permitted to act over the entire surface of that portion of diaphragm 21' included within the outside diameter of annular groove 24'. This area is so selected that the reduced pressure of 19 p.s.i. will hold diaphragm 21' away from seat 27' against the bias of spring 32'.

The reduction in supply pressure from 23 p.s.i. to 19 p.s.i. does not affect the mode of operation of the thermostat except that the change in pressure in chamber 88 of the readjustment motor permits bimetallic bar 66' to move away from the leak port 56' and thus establish a lower set point.

Summarizing the operation of FIG. 3 system, it is seen that as supply pressure is varied between 15 and 19 p.s.i. the thermostat is direct acting and establishes different set points for day and night depending upon the magnitude of the supply pressure. On the other hand, when supply pressure is raised to 23 p.s.i. and then varied between this value and 19 p.s.i., the thermostat is reverse acting, and, as in the former case, different day and night set points are established. It thus will be apparent that four settings of the thermostat have been achieved with only three different supply pressures.

FIG. 4 illustrates a second heating and cooling thermostat which employs the basic switch 11, and which utilizes a shuttle valve unit 101 in lieu of the pneumatic relay 13 of the FIG. 1 embodiment. As in the previous case, the common inlet passage 25 of switch 11 receives fluid selectively from a pair of sources 102 and 103 through the supply line 104 and under the control of a selector valve 105. The outlet passages 28 and 29 of switch 11 are connected with the direct and reverse-acting leak ports 106 and 107, respectively, of assembly 108 by lines 109 and 111 containing flow restrictors 112 and 113. The shuttle valve unit 101 automatically senses which leak port is in control and transmits to branch line 114 the control pressure in line 109 or 111 between the controlling leak port and the flow restrictor.

The shuttle valve unit 101 is constructed in much the same manner as switch 11 and comprises three rigid body plates 115–117 which are separated by two rubber-like diaphragms 118 and 119 that perform valving as well as sealing functions. These parts are held together by screws (not illustrated). Formed in the upper face of lower body plate 115 is an annular groove 121 that is connected with line 109 at a point downstream of flow restrictor 112 by conduit 122. Groove 121 defines and is coaxial with an annular valve seat 123 which is provided with a central outlet passage 124 leading to branch line 114. The portion of diaphragm 118 overlying annular groove 121 and the valve seat 123 define a shuttle valve 120 for controlling communication between conduit 122 and branch line 114. The lower face of upper plate 117 is provided with a circular recess or motor chamber 125 which is coaxial with annular groove 121 and which is connected with line 111 at a point upstream of flow restrictor 113 by conduit 126. Between and coaxial with annular groove 121 and chamber 125 is a vented chamber 127 formed in the center plate 116 and containing a thrust transmitter 128. When the diaphragm 119 is flexed downward by the pressure in chamber 125, this transmitter 128 forces diaphragm 118 into sealing engagement with annular valve seat 123 and closes shuttle valve 120.

At its left side, the shuttle valve unit 101 is provided with a second valve 120' including annular groove 121', seat 123', central outlet passage 124', motor chamber 125', vented chamber 127', and thrust transmitter 128' which are identical to the corresponding parts of the first shuttle valve 120. Central outlet passage 124' is connected with branch line 114 and annular groove 121' is connected with line 111 at a point downstream of flow restrictor 113 by conduit 122'. Motor chamber 125' is connected with line 109 at a point upstream of flow restrictor 112 by conduit 126'.

The leak port assembly 108 includes the two leak ports 106 and 107 mentioned previously and a pair of lids 129 and 131, which are mounted to flex at points 132 and 133, respectively. The lids are actuated by an input lever 134 which is mounted to flex at point 135 and which has another flexure point 136. When the lever 134 flexes, the right end pivots about a point 137 defined by a knife edge carried by a lever 138. Lever 138 is mounted to flex about point 139 and can be deflected in opposite directions about this point by a set point adjusting screw 141. A spring 142 urges input lever 134 upward into engagement with the knife edge carried by lever 138. The right end of input lever 134 engages directly a knife edge carried by lid 131 and carries a bimetallic strip 143 that engages a knife edge on lid 129. Input lever 134 is actuated by a bellows motor 144 that is connected with a thermometric bulb 145. The parts of the leak port assembly 108 are so adjusted that in the heating season leak port 107 is open and, in the cooling season, leak port 106 is open.

During the heating season, the selector valve 105 is shifted to a position in which source 102 is connected with supply line 104 so that air at 15 p.s.i. is delivered to the common inlet passage 25 of switch 11. Since this supply pressure is not sufficient to overcome the closing bias of spring 32, the valve with which this spring is associated remains closed and outlet passage 29, line 111 and conduits 122' and 126 are vented to atmosphere through the open reverse-acting leak port 107. Since the motor chamber 36 of the other switch valve is vented, this valve opens and thereby transmits air from inlet passage 25 to outlet passage 28 and line 109. The pressure in line 109 between restrictor 112 and the direct-acting leak port 106 depends upon the position of lid 129 and this in turn depends upon the temperature sensed by bulb 145. If the temperature sensed by the bulb rises, bellows motor 144 moves upward flexing input lever 134 at flex points 135 and 136. As the input lever flexes, its right end pivots downward about point 137, thereby permitting lid 129 to move in the counterclockwise direction about its flexure point 132 and increase the restriction to flow through direct-acting leak port 106. When the bulb temperature decreases, the right end of input lever 134 moves upward about pivot point 137, thereby pivoting lid 129 in the clockwise direction about flexure point 132 and decreasing the restriction to flow through leak port 106.

The control pressure in line 109 between the leak port 106 and the flow restrictor 112 is transmitted to the annular groove 121 in the shuttle valve unit 101 through conduit 22. Since, at this time, chamber 125 is vented through the reverse-acting leak port 107, shuttle valve 120 opens and transmits the control pressure from line 109 to branch line 114. Annular groove 121' is vented to atmosphere and chamber 125' is subject to the 15 p.s.i. pressure in line 109 upstream of flow restrictor 112, and, therefore, shuttle valve 120' remains closed. As the flow restriction through direct-acting leak port 106 is increased and decreased by lid 129, the control pressure transmitted to the regulating valve through branch line 114 increases and decreases, respectively. This valve closes upon an increase in branch line pressure, and as a result, the flow of heating medium is decreased and increased, respectively, as the temperature sensed by bulb 145 rises and falls.

During the cooling season, selector valve 105 is shifted to the position in which source 103 is connected with supply line 104. The pressure of this source is sufficient to overcome the bias of spring 32 and therefore, at this time, diaphragm 21 moves away from seat 27. Since motor chamber 36 is now pressurized, diaphragm 21 closes on seat 36 and thereby interrupts the flow of fluid to line 109. As a result, this line and conduits 122 and 126' are vented to atmosphere through direct-acting leak port 106 and the pressures in annular groove 121 and motor chamber 125' are dissipated. Since motor chamber 125 is now pressurized through conduit 126, shuttle valve 120 closes. The control pressure in line 111 between flow restrictor 113 and reverse-acting leak port 107 is transmitted to annular groove 121' through conduit 122' so shuttle valve 120' opens and relays this control pressure to branch line 114. As the temperature sensed by bulb 145 increases, the right end of input lever 134 moves downward and lid 131 moves away from leak port 107 and decreases the control pressure in line 111. Therefore, this change in control pressure causes the regulating valve to open and increase the flow of cooling medium to the heat exchanger. As the temperature sensed by bulb 145 decreases, the right end of input lever 134 moves upward to thereby cause lid 131 to move toward leak port 107 and increase the restriction to flow through it. The control pressure in line 111 now rises and the regulating valve closes to reduce the flow of cooling medium.

When the thermostat is restored to heating operation, diaphragm 21 of the switch 11 closes against seat 27 and interrupts the flow of fluid to line 111. Consequently, this line, conduits 122' and 126, annular groove 121' and chambers 36 and 125 are again vented to atmosphere through reverse-acting leak port 107. Simultaneously, or approximately simultaneously, line 109, conduits 122 and 126', and annular groove 121 are pressurized. As a result, shuttle valve 120' closes and shuttle valve 120 opens. Now the control pressure in line 109 between flow restrictor 112 and the direct-acting leak port 106 is again transmitted to branch line 114.

The bimetallic strip 143 in the leak port assembly 108 compensates for changes in the temperature of the assembly. Thus, if the temperature at bellows 144 rises at a time when the temperature sensed by bulb 145 is constant, the bellows will move upward as a result of the expansion of the liquid in it and tend to cause input lever 134 to move lid 129 toward leak port 106. However, since the bimetallic strip 143 moves upward with an increase in temperature, it counteracts this tendency and maintains lid 129 in the desired position relative to leak port 106.

The set point of the thermostat can be varied by rotating adjusting screw 141 in opposite directions. When the screw 141 is moved downward, to deflect lever 138 in the counterclockwise direction about flexure point 139, pivot point 137 moves downward causing input lever 134 to flex about point 136. Since this movement of the pivot point 137 causes the right end of lever 134 to move downward, lid 129 moves in the closing direction with respect to leak port 106 and thereby raises the control pressure in line 109. During the cooling season, this same movement of screw 141 causes lid 131 to move away from leak port 107 and thus decrease the control pressure in line 111. Upward movement of screw 141 has the effect of decreasing and increasing the control pressures in lines 109 and 111, respectively.

As stated previously, the drawings and descriptions relate only to the preferred forms of the invention. Since many changes in the structure of these embodiments will be obvious to those skilled in the art, the following claims should provide the sole measure of the scope of the invention.

What is claimed is:

1. In combination, first and second valves, each having an inlet port, an outlet port, and a movable member shiftable in opening and closing directions for controlling communication between the inlet and outlet ports; a common inlet passage connected with both inlet ports; two outlet passages, one connected with each outlet port; means biasing the movable member of the first valve in the closing direction; first and second pressure-responsive means associated with the movable members of the first and second valves, respectively, each pressure-responsive means being subject to the pressure in the inlet passage and being arranged to urge the valve member in the opening direction; and a third pressure-responsive means associated with the movable member of the second valve and subject to the pressure in the outlet passage connected with the first valve, this pressure-responsive means being dimensioned and arranged to urge the valve member in the closing direction against the bias of the second pressure-responsive means.

2. The combination defined in claim 1 including a fourth pressure-responsive means associated with the movable member of the first valve and subject to the pressure in the outlet passage connected with it, this pressure-responsive means being arranged to urge the movable member in the opening direction.

3. The combination defined in claim 2 in which the effective area of the fourth pressure-responsive means is so small relative to the effective area of the first pressure-responsive means that it has negligible effect on the movement of the movable valve member.

4. The combination defined in claim 2 in which the effective area of the fourth pressure-responsive means is of sufficient size relative to the effective area of the first pressure-responsive means that it has an appreciable effect on the movement of the movable valve member.

5. The combination defined in claim 4 which includes a fluid source connected with the inlet passage; a restricted leak port venting each outlet passage; a flow restriction located in each outlet passage between the leak port and the outlet port of the valve; control means associated with each leak port for varying the restriction it affords; and two fluid pressure motors, one being subject to the pressure in each outlet passage between the leak port and the flow restriction.

6. The combination defined in claim 4 including a pressure source connected with the common inlet passage and capable of supplying fluid at a selected one of three different pressures, namely a low pressure which is ineffective to open the first valve, a high pressure which is effective to open the first valve, and an intermediate pressure which is ineffective to open the first valve if it is closed but which is effective to hold that valve open if it already is open; a branch line; an admission and exhaust relay controlling supply flow from the source to the branch line and exhaust flow from the branch line to atmosphere; two fluid pressure operated motors connected to actuate the relay valve in the same sense, one motor having a working chamber which is connected with one of the outlet passages and the other motor having a working chamber which is connected with the other outlet passage; a pair of leak ports, one connected with each working chamber; a pair of thermostatic elements, each being arranged to regulate the restriction to flow through one leak port, the elements reacting in opposite senses to changes in temperature; and a motor responsive to source pressure and serving to modify the adjustment of both thermostatic elements in the same sense.

7. The combination defined in claim 6 including a motor responsive to branch line pressure and serving to modify the adjustment of both thermostatic elements in the same sense.

8. The combination defined in claim 1 which includes
   (a) a source of fluid under pressure connected with the inlet passage and capable of delivering fluid at a selected one of two pressures;
   (b) a restricted leak port venting each outlet passage;
   (c) a flow restriction located in each outlet passage between the leak port and the outlet port of the valve;
   (d) control means associated with each leak port for varying the restriction it affords; and
   (e) two fluid pressure motors, one being subject to the pressure in each outlet passage between the leak port and the flow restriction.

9. In combination
   (a) a source capable of delivering fluid at a selected one of two pressures;
   (b) first and second valves, each having an inlet port, an outlet port, and a movable member shiftable in opening and closing directions for controlling communication between the inlet and outlet ports;
   (c) inlet passage means connecting the inlet ports of the first and second valves with the source;
   (d) first and second leak ports;
   (e) first and second outlet passages connecting the outlet ports of the first and second valves, respectively, with the first and second leak ports;
   (f) first and second flow restrictors located, respectively, in the first and second outlet passages;
   (g) means biasing the movable member of the first valve in the closing direction;
   (h) first and second pressure-responsive means associated with the movable members of the first and second valves, respectively, each pressure-responsive means being subject to the pressure in the inlet passage means and being arranged to urge the valve member in the opening direction;
   (i) a third pressure-responsive means associated with the movable member of the second valve and subject to the pressure in the first outlet passage upstream of the flow restriction, this pressure-responsive means being dimensioned and arranged to urge the valve member in the closing direction against the bias of the second pressure-responsive means;
   (j) a third valve having an inlet port connected with the first outlet passage downstream of the flow restriction, an outlet port, and a movable member shiftable in opening and closing directions;
   (k) a fourth valve having an inlet port connected with the second outlet passage downstream of the flow restriction, an outlet port and a movable member shiftable in opening and closing directions;
   (l) a common delivery passage connected with the outlet ports of the third and fourth valves;
   (m) fourth and fifth means responsive, respectively, to the pressures in the first and second outlet passages upstream of the flow restriction for urging the movable members of the fourth and third valves, respectively, in the closing direction;

(n) sixth and seventh means responsive, respectively, to the pressures in the first and second outlet passages downstream of the flow restrictions for shifting the movable members of the third and fourth valves, respectively in the opening direction; and (o) control means for varying in reverse senses the flow restrictions afforded by the leak ports so that the restriction to flow through one leak port is increased as the restriction to flow through the other is decreased and vice versa.

10. In combination
(a) a source capable of delivering fluid at a selected one of two pressures;
(b) four valves, each having an inlet port, an outlet port, a member movable in opening and closing directions for controlling communication between the inlet and outlet ports and first means responsive to the pressure at the inlet port for urging the movable member in the opening direction;
(c) first and second leak ports;
(d) a fluid pressure operated device;
(e) means for varying in reverse senses the restrictions to flow through the leak ports so that the restriction to flow through one leak port is increased as the restriction to flow through the other is decreased and vice versa;
(f) a common inlet passage connecting the source with the inlet ports of the first and second valves;
(g) a common delivery passage connecting the fluid pressure operated device with the outlet ports of the third and fourth valves;
(h) first and second outlet passages connecting the outlet ports of the first and second valves, respectively, with the first and second leak ports;
(i) means biasing the movable member of the first valve in the closing direction and for maintaining the valve closed when the source is delivering fluid at the lower pressure;
(j) second and third means responsive to the pressure at the outlet port of the first valve for urging the movable members of the second and third valves respectively, in the closing direction against the bias of their first pressure-responsive means;
(k) fourth means responsive to the pressure at the outlet port of the second valve for urging the movable member of the fourth valve in the closing direction against the bias of its first pressure-responsive means;
(l) first and second flow restrictors located, respectively, in the first and second outlet passages; and
(m) first and second conduit means connecting the first and second leak ports, respectively, with the inlet ports of the fourth and third valves.

11. In combination
(a) a source capable of delivering fluid at a selected one of two pressures;
(b) a fluid pressure operated device;
(c) first and second leak ports;
(d) means for varying in reverse senses the restrictions to flow through the leak ports so that the restriction to flow through one leak port is increased as the restriction to flow through the other is decreased and vice versa;
(e) first and second conduits connected with the first and second leak ports, respectively, each conduit containing a flow restrictor;
(f) means responsive to the pressure of the source for connecting the source with the first conduit when the pressure is the lower of said two pressures and for connecting the source with the second conduit when the pressure is the higher of said two pressures; and (g) means responsive to the pressures in the conduits for transmitting to the fluid pressure operated device a pressure that is proportional to the pressure in the first conduit downstream of the flow restrictor when the pressure in this conduit is higher than the pressure in the second conduit, and for transmitting to the fluid pressure operated device a pressure that is proportional to the pressure in the second conduit downstream of the flow restrictor when the pressure in this conduit is higher than the pressure in the first conduit.

12. In combination
(a) a source capable of delivering fluid at a selected one of two pressures;
(b) a fluid pressure operated device;
(c) first and second leak ports;
(d) means for varying in reverse senses the restrictions to flow through the leak ports so that the restriction to flow through one leak port is increased as the restriction to flow through the other is decreased and vice versa;
(e) first and second conduits connected with the first and second leak ports, respectively, each conduit containing a flow restrictor;
(f) means responsive to the pressure of the source for connecting the source with the first conduit when the pressure is the lower of said two pressures and for connecting the source with the second conduit when the pressure is the higher of said two pressures;
(g) means responsive to the differential between the pressure in the first conduit downstream of the flow restrictor and the pressure in the second conduit upstream of the flow restrictor for connecting the fluid pressure operated device with the first conduit at a point downstream of the flow restrictor when the first conduit is connected with the source and for isolating the fluid pressure operated device from the first conduit when the second conduit is connected with the source; and
(h) means responsive to the differential between the pressure in the second conduit downstream of the flow restrictor and the pressure in the first conduit upstream of the flow restrictor for connecting the fluid pressure operated device with the second conduit at a point downstream of the flow restrictor when the second conduit is connected with the source and for isolating the fluid pressure operated device from the second conduit when the first conduit is connected with the source.

13. In combination
(a) a source capable of delivering fluid at a selected one of two pressures;
(b) four valves, each having an inlet port, an outlet port, a member movable in opening and closing directions for controlling communication between the inlet and outlet ports and first means responsive to the pressure at the inlet port for urging the movable member in the opening direction;
(c) first and second leak ports;
(d) a fluid pressure operated device;
(e) means for varying in reverse senses the restrictions to flow through the leak ports so that the restriction to flow through one leak port is increased as the restriction to flow through the other is decreased and vice versa;
(f) a common inlet passage connecting the source with the inlet ports of the first and second valves;
(g) a common delivery passage connecting the fluid pressure operated device with the outlet ports of the third and fourth valves;
(h) first and second outlet passages connecting the outlet ports of the first and second valves, respectively, with the first and second leak ports;
(i) means biasing the movable member of the first valve in the closing direction and for maintaining the valve closed when the source is delivering fluid at the lower pressure;

(j) second and third means responsive to the pressure at the outlet port of the first valve for urging the movable members of the second and third valves respectively, in the closing direction against the bias of their first pressure-responsive means;

(k) fourth means responsive to the pressure at the outlet port of the second valve for urging the movable member of the fourth valve in the closing direction against the bias of its first pressure-responsive means; and (l) first and second conduit means connecting the first and second leak ports, respectively, with the inlet ports of the fourth and third valves.

References Cited in the file of this patent
UNITED STATES PATENTS

| | | |
|---|---|---|
| 1,819,045 | Snediker | Aug. 18, 1931 |
| 2,193,295 | Otto | Nov. 12, 1940 |
| 2,258,366 | Otto | Oct. 7, 1941 |
| 2,511,340 | Joesting | June 13, 1950 |
| 2,973,772 | Oglesby | Mar. 7, 1961 |